(12) United States Patent
Pfnuer et al.

(10) Patent No.: US 7,372,647 B2
(45) Date of Patent: May 13, 2008

(54) LENS MOUNT ASSEMBLY FOR OPTICAL COMPONENTS

(75) Inventors: Stefan Pfnuer, Los Gatos, CA (US); David Morgenstern, Palo Alto, CA (US); Kinya Nippa, Sunnyvale, CA (US)

(73) Assignee: Finisar Corporation, Sunnyvale, CA (US)

( * ) Notice: Subject to any disclaimer, the term of this patent is extended or adjusted under 35 U.S.C. 154(b) by 64 days.

(21) Appl. No.: 11/026,238

(22) Filed: Dec. 29, 2004

(65) Prior Publication Data

US 2006/0139774 A1 Jun. 29, 2006

(51) Int. Cl.
*G02B 7/02* (2006.01)

(52) U.S. Cl. .................. 359/819; 359/809; 359/815

(58) Field of Classification Search .............. 359/819
See application file for complete search history.

(56) References Cited

U.S. PATENT DOCUMENTS 3,930,711 A * 1/1976 Powell ................ 359/616
6,215,604 B1 * 4/2001 Hori ..................... 359/819
6,550,983 B1 * 4/2003 Gilliland et al. ........... 385/93
6,967,775 B1 * 11/2005 Millett ................... 359/399
2004/0174618 A1 * 9/2004 Kikuchi .................. 359/811
2005/0200979 A1 * 9/2005 Nishihara et al. ......... 359/819
2006/0098307 A1 * 5/2006 Campean ................ 359/819

* cited by examiner

*Primary Examiner*—Jessica T Stultz
(74) *Attorney, Agent, or Firm*—Workman Nydegger

(57) ABSTRACT

A lens mount assembly for securing a lens in a predetermined position within an optical device is disclosed. The lens mount assembly is configured so as to retain the lens in a press fit arrangement, thereby eliminating the need for adhesives or other mechanical means in order to secure the lens. In one embodiment the lens mount assembly includes a glass lens having an outer surface with a predetermined amount of surface roughness. A retention tube defines a cylindrical volume and is composed of a compliant material that resiliently deforms when the lens is pressed into the cylindrical volume. The compliant material recompresses a small amount around the lens to secure it within the retention tube. A base is attached to or integrally formed with the retention tube and includes a corrugated surface for securing the lens mount assembly within the optical device.

22 Claims, 4 Drawing Sheets

LENS MOUNT ASSEMBLY FOR OPTICAL COMPONENTS

BACKGROUND

1. Technology Field

The present invention generally relates to optical devices. In particular, embodiments of the present invention relate to a lens mount assembly that secure a lens in a predetermined position without the use of glue or other adhesives or mechanical features.

2. The Related Technology

The use of lenses is ubiquitous in optical devices. Commensurate with a lens' utility, however, is the importance of positioning and maintaining the position of the lens within the optical device in which it is disposed. This is most often accomplished by the use of a lens mount assembly.

Typically, a lens is secured within the lens mount assembly through the use of adhesives or traditional mechanical features. These techniques, however, have suffered from various challenges. Securing the lens in the assembly with an adhesive, for instance, is a relatively complex and time-intensive process, which reduces the efficiency of the lens mount assembly manufacture.

In the case of lens mount assemblies using mechanical means, other challenges have arisen. These assemblies have typically included a shoulder or other mechanical structure to secure the lens within the lens retention volume. Undesirably, however, this technique increases localized stresses on the lens, resulting in a higher failure rate and lower manufacturing yield.

In light of these challenges, a need exists for a means by which a lens can be securely positioned within a mounting assembly for use in an optical device, such as an optical subassembly in an optical transceiver module. In addition, the lens should be secured without the imposition of localized stress that can damage the lens or assembly. Further, any solution to this need should enable manufacturing yields to significantly increase over those traditionally encountered in known adhesive-based lens mount assemblies.

BRIEF SUMMARY

Briefly summarized, embodiments of the present invention are directed to a lens mount assembly for securing a lens in a predetermined position within an optical device. The lens mount assembly is configured so as to retain the lens in a press fit arrangement, thereby eliminating the need for glue, other adhesives, or other mechanical means in order to secure the lens. In one embodiment the lens mount assembly includes a glass lens having an outer surface with a predetermined amount of surface roughness. A retention tube defines a cylindrical volume and is composed of a compliant material that resiliently deforms when the lens is pressed into the cylindrical volume. The compliant material recompresses a small amount around the lens to secure it within the retention tube. A base is attached to or integrally formed with the retention tube and includes a corrugated surface for securing the lens mount assembly within the optical device. In one embodiment, therefore, a lens mount assembly for use in an optical device is disclosed, comprising a retention portion having a compliant first engaging surface that defines a volume, a lens defining a second engaging surface that engages with the first engaging surface in a press fit arrangement such that the lens is securely retained within the volume of the retention portion, and a base portion having at least one surface for engaging the optical device such that the retention portion and the lens are secured within the optical device.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

Figure 1B:
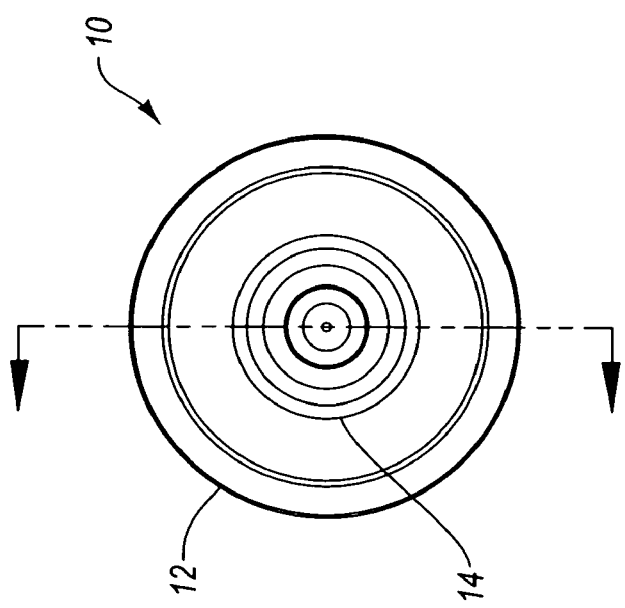
FIG. 1B is an end view of the TOSA of FIG. 1A.
Figure 1A:
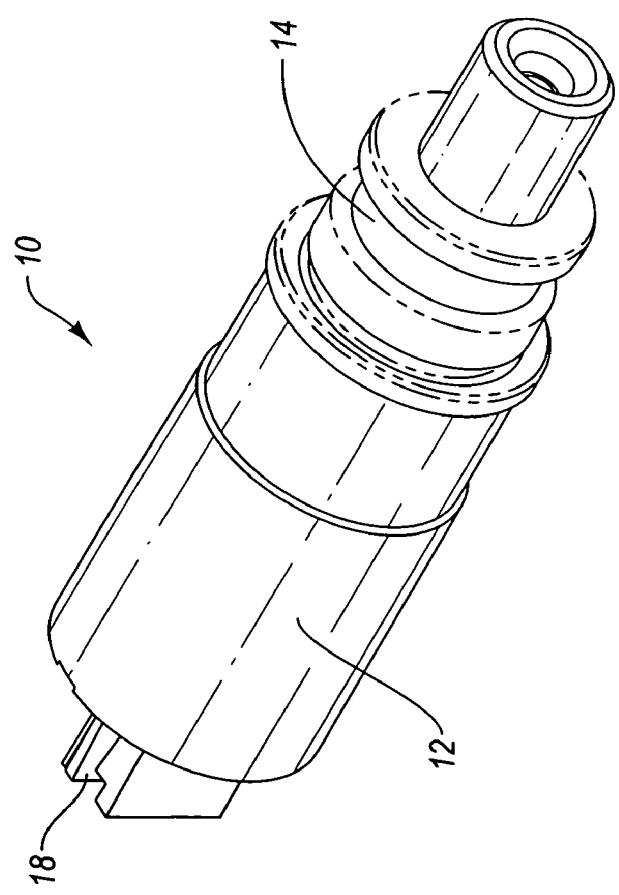
FIG. 1A is a perspective view of a transmitter optical subassembly ("TOSA") that serves as an exemplary environment in which embodiments of the present invention can be practiced.
Figure 1C:
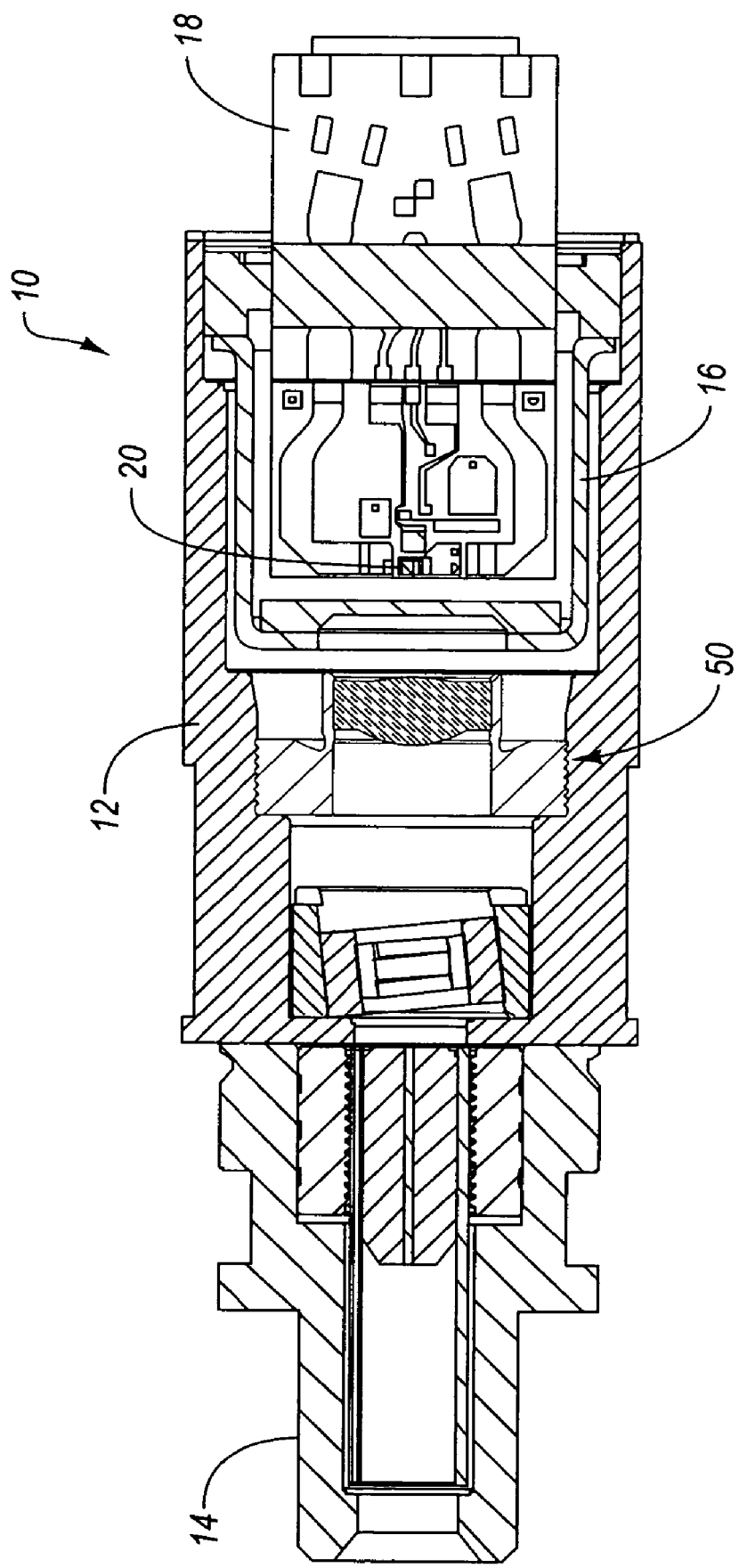
FIG. 1C is a cross sectional view of the TOSA taken along the line shown in FIG. 1B.
Figure 1D:
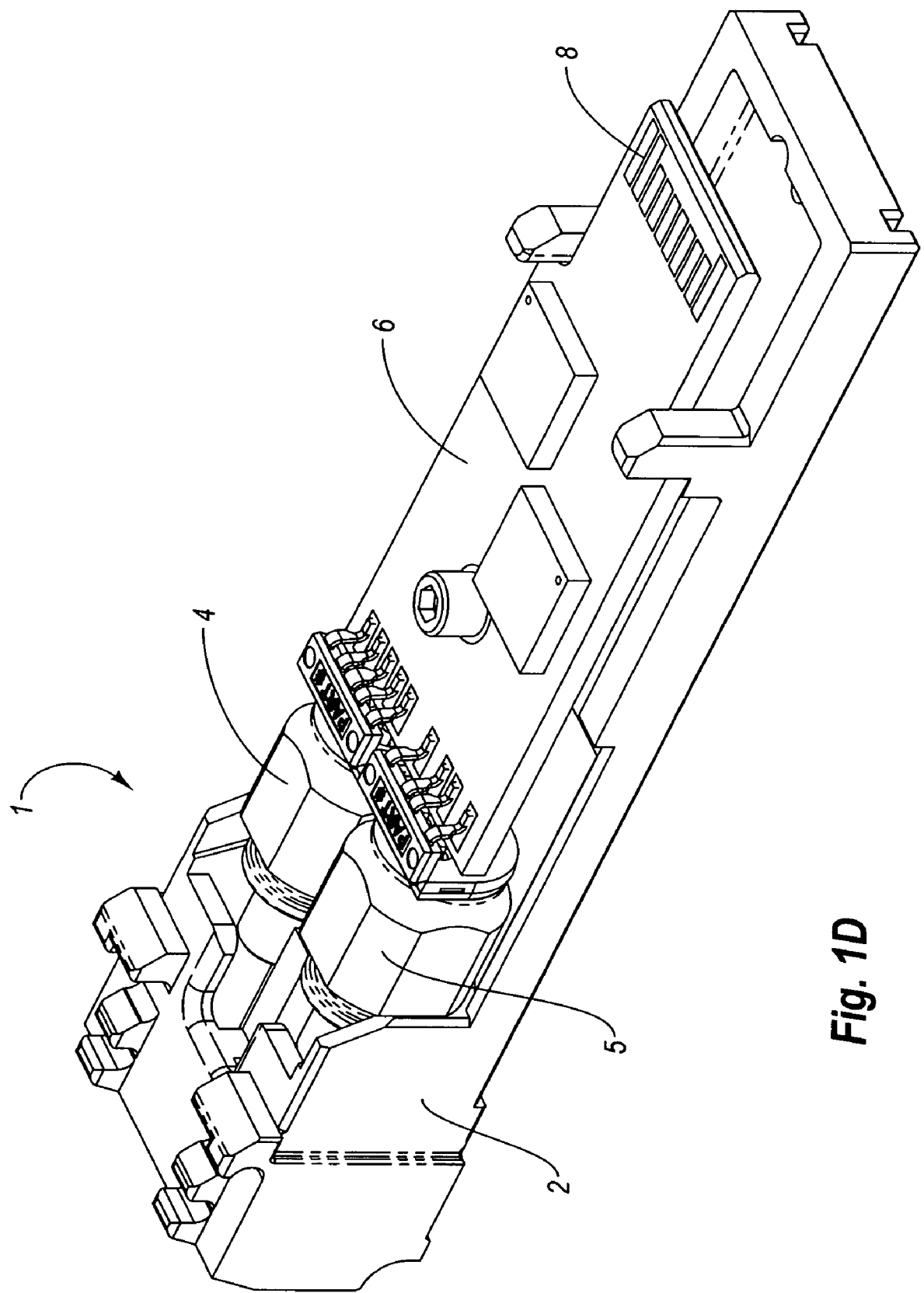
FIG. 1D is a perspective view of an exemplary optical transceiver module in which a TOSA, such as the TOSA shown in FIGS. 1A-1C, can be positioned.
Figure 2:
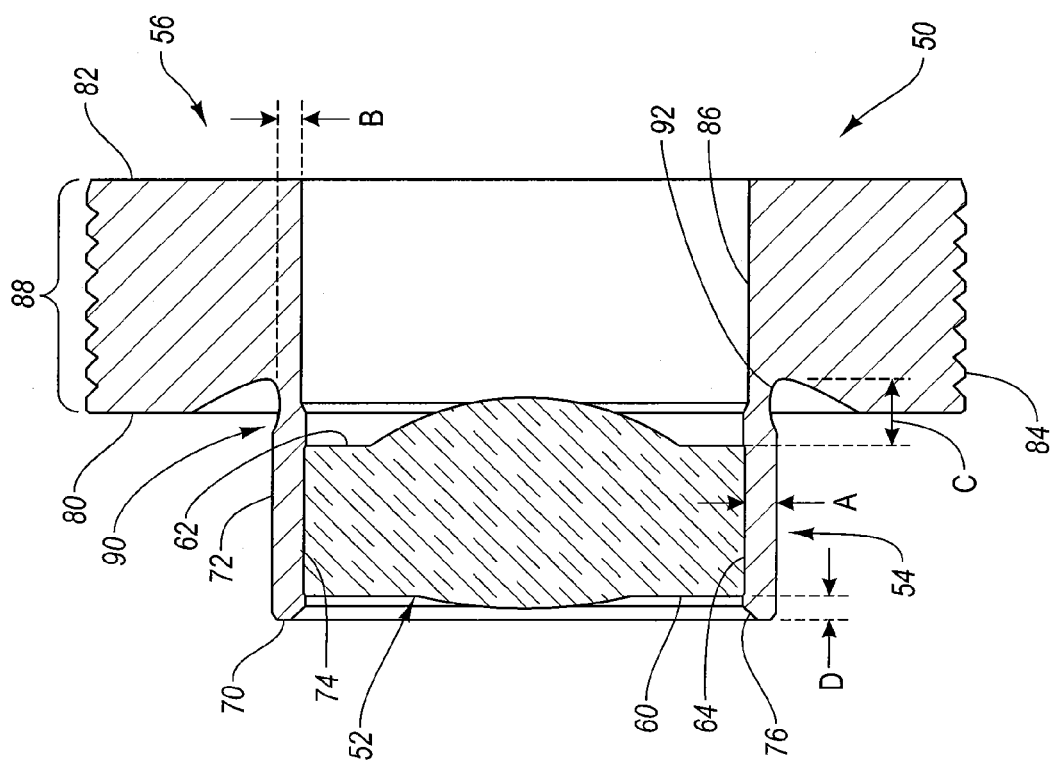
FIG. 2 is a cross sectional view of a lens mount assembly, according to one embodiment of the present invention.

FIGS. 1A-2 depict various features of embodiments of the present invention, which is generally directed to a lens mount assembly for use in optical components, such as optical subassemblies utilized in optical transceiver modules. The design of the lens mount assembly enables a secure fit for a lens to be achieved without the use of glues or other adhesives. Instead, a press fit is employed to secure the lens within the assembly. Notwithstanding this press fit, the lens is retained within the assembly with sufficient retention force so as to withstand movement during mechanical shock events and thermal cycling stresses likely to be imposed on the assembly. Further, the configuration of the lens mount assembly is such that localized stress on the lens is reduced over known designs, thereby reducing lens damage during assembly. As a result of these features, manufacturing yields are increased over known designs.

Reference is first made to FIG. 1D, which shows a perspective view of an optical transceiver module ("transceiver"), generally designated at 1, that is suitable for containing a lens mount assembly made in accordance with embodiments of the present invention. In detail, the transceiver 1 includes a housing 2 that cooperates with a shell (not shown) in containing various components, such as a transmitter optical subassembly 4, a receiver optical subassembly 5, and a printed circuit board ("PCB") 6. The PCB 6 includes an edge connector 8 that enables the transceiver 1 to interface with a device (not shown). The transceiver 1 can be used to enable the device to connect with a communications network, such as the Internet, and as such, to transmit and receive data in the form of optical signals via optical fibers that connect with the transceiver.

Reference is now made to FIGS. 1A-1C, which show various features of one environment in which embodiments of the present invention can be practiced. Specifically, FIG. 1A shows a perspective view of a transmitter optical subassembly ("TOSA"), generally designated at 10, that is used in transmitting an optical signal to an optical fiber in a communications network, for instance. The TOSA 10 of FIGS. 1A-1C is identical, in one embodiment, to the transmitter optical subassembly 4 shown in FIG. 1D. The TOSA 10 includes a housing 12 coupled to a nosepiece 14 that interfaces with an optical fiber (not shown). In one embodiment, the TOSA 10 is included within and forms part of an optical transceiver module (not shown). The optical transceiver module can be interfaced with a device of the communications network to enable the device to transmit and receive data carried by the optical signals that are transmitted via optical fibers, such as the optical fiber that couples to the nosepiece 14 of, the TOSA 10. FIG. 1B shows an end view of the TOSA 10.

FIG. 1C shows a cross sectional view of the TOSA 10, illustrating additional TOSA components. As shown, the TOSA 10 includes a transistor outline package, or TO can 16, which contains a plurality of electronic and opto-electronic components used during TOSA operation. These components are electrically interfaced with the optical transceiver module via a connector 18. The TO can 16 includes a light source, such as a laser die 20, that produces an optical signal for carrying data received from the device connected to the TOSA 10. This data-carrying optical signal produced by the laser die 20 passes through various other components of the TOSA 10, some of which are described below, before passing into an optical fiber (not shown) that is received by the nosepiece 14.

The TOSA 10 further includes a lens mount assembly ("LMA"), generally designated at 50, according to one embodiment of the present invention. The LMA 50 is employed in focusing an optical signal produced by a laser (not shown) of the TOSA 10 before its transmission to the communications network. Further details regarding the LMA 50 are given directly below.

Notwithstanding the above discussion concerning a TOSA as one exemplary environment, it should be remembered that the principles of the present invention can be practiced in connection with a variety of other optical devices that employ at least one lens. For instance, a receiver optical subassembly ("ROSA") or other optical component used in optical data transfer systems can employ embodiments of the lens mount assembly. Further, use of the lens mount assembly can be expanded to other optically-related devices including, for instance, CD/DVD players, cameras, etc. Thus the discussion herein should not be construed to limit the scope of the present invention.

Reference is now made to FIG. 2, which depicts various features of one embodiment of the LMA 50 shown in FIG. 1. The LMA 50 generally includes a lens 52, a retention tube 54, and a base 56. In particular, the lens 52 is glass and is formed to include a first surface 60, a second surface 62, and an outer periphery 64. Each of the first and second surfaces 60 and 62 is shaped so as to condition and/or focus an optical signal passing therethrough. The outer periphery 64 forms a cylindrical surface that engages with an interior surface of the retention tube 54 in a manner to be described below. In other embodiments, the first and second surfaces 60, 62, and the outer periphery 64 of the lens 52 can be formed as to define other shapes as may be required for a particular application. Note that the lens surface forming the outer periphery 64 can include surface features to give the surface a pre-determined surface smoothness or roughness according to the LMA design. In the present embodiment, the lens outer periphery 64 includes some surface features to enable a more secure fit between the lens 52 and the retention tube 54.

The retention tube 54 houses the lens 52 in a specified configuration as shown in FIG. 2. In detail, the retention tube 54 includes a first end 70, an outer diameter 72, and an inner diameter 74. A chamfer 76 is included on the first end 70. Though integrated with the base 56 in the illustrated embodiment, the retention tube 54 can be separately formed then attached with the base in another embodiment. In such a case, the retention tube 54 can include a second end.

As shown, the lens 52 is positioned such that it resides within the cylindrical volume defined by the inner diameter 74 of the retention tube 54. Further, the lens 52 engages the inner diameter 74 of the retention tube 54 in an interference, or press-fit, engagement such that the lens is securely positioned therein. As such, no glue or other adhesive is required to secure the lens 52 within the retention tube 54. Further, because the press fit engagement of the lens 52 is sufficiently secure, no shoulder or other mechanical stop is needed on the inner diameter 74 to retain the lens.

The press fit engagement of the lens 52 in the retention tube 54 is made possible by a resilient radial force provided by the design and composition of the retention tube 54. In particular, the retention tube 54 is made from a material having sufficient resilient properties, such as metallic materials, for instance. In one embodiment, the retention tube 54 is made from stainless steel 303, which possesses such resilient properties, but it should be appreciated that a wide variety of materials can also be acceptably used.

As mentioned, retention tube design also contributes to the press fit lens arrangement shown in FIG. 2. In particular, the inner diameter 74 of the tube in the region of lens retention includes a smooth, high surface finish. No shoulders or other mechanical features are included on the inner diameter 74. The thickness of the retention tube wall, indicated at "A," that defines the inner diameter 74 is sized so as to provide a sufficient amount of interference when the lens 52 is inserted in the retention tube 54, as explained below. As such, the retention tube 54 provides a compliant, compressive retention force that is sufficient to firmly hold the lens 52 in place after insertion. In one embodiment, the thickness "A" of the wall, which is defined between the outer diameter 72 and the inner diameter 74, is approximately 8 mils (0.008 inch), wherein the retention tube 54 is composed of stainless steel 303. This wall thickness provides approximately 10 lbs. of retention force, which is sufficient to prevent lens movement within the retention tube under thermal cycling expansion and contraction and mechanical shock events. At the same time, the retention force is limited so as to prevent unnecessary critical stresses from being imposed on the lens. In other embodiments, the retention tube wall thickness, as well as the tube material composition and surface roughness of the lens outer periphery and retention tube inner diameter, can be varied to provide varying retention forces as may be needed for a particular application. Advantageously, tensile stress on the lens 52 is minimized by the present design. Generally, retention force imparted to the lens can vary according to various factors, including retention tube material, lens material, lens size and thickness, roughness of the lens and retention tube engaging surfaces, the amount of dimensional interference between the lens outer periphery and the retention tube inner diameter, and other factors.

Because the lens 52 is press fit into the retention tube 54 and is secured therein with a sufficient retention force, in many cases, no glue or other adhesive is necessary to secure the lens in position. In other embodiments, an adhesive can be applied if the application requires it (i.e., if the retention force needs to be further increased). The LMA 50 also does not require a hermetic seal in order to properly secure its components within an optical component, such as a TOSA.

Note here that, similar to the lens 52, the retention tube 54 can be formed to have any one of a variety of cross sectional shapes to accommodate the press fit receipt therein of a similarly shaped lens. Thus, the particular configurations of the components of the LMA as disclosed herein should not be considered limiting of the present invention in any way.

The LMA 50 also includes the base 56. In one embodiment, the base 56 is integrally formed with the retention tube 54, and as such is also composed of 303 stainless steel. The base 56 includes a first end 80, a second end 82, an outer surface 84, and an inner diameter 86. The outer surface 84 extends between the first and second ends 80 and 82, and defines a cylindrical outer periphery of the base 56 having an extended diameter with respect to the outer diameter 72 of the retention tube 54. The inner diameter 86 coincides with the inner diameter 74 of the retention tube 54 and thereby cooperates to define a hollow, cylindrical volume, a portion of which houses the lens, as previously described. As shown in FIG. 2, the diameter of the base inner diameter 86 is slightly greater than that of the retention tube 54 such that a shoulder is defined at an annular interface 90 of the retention tube with the base 56. This also helps to improve machinability of the high surface finish and tolerancing of the inner side of the retention tube. The inner diameter of the base does not need high surface finish and tight tolerances. This is also a cost saving, since the region that needs accurate machining is minimized. The shoulder does not directly interact with the lens 52, however, and does not physically retain the lens in position. In other embodiments, the inner diameters of the retention tube and base can be substantially the same so as not to define a shoulder between them.

The base outer surface 84 includes a series of corrugations 88 that are circumferentially defined about the circumference of the base 56. The corrugations 88 are employed in providing an adequate fit between the LMA 50 and an interior portion of the TOSA in which the LMA is positioned, such as the TOSA 10 shown in FIGS. 1A-1C. Further, the corrugations 88 allow for relatively greater fit tolerances between the LMA 50 and the TOSA 10.

The annular interface 90 includes various features to assist in the placement and securing of the lens 52 in the LMA 50. In particular, the wall thickness of the retention tube 54/base 56 at the interface 90 is reduced relative to the rest of the wall of the retention tube, as indicated by dimension "B." In addition, an undercut feature 92 is annularly defined in the first end 80 of the base 56 at the interface 90. In the embodiment illustrated in FIG. 2, the undercut feature 92 extends a horizontal, or axial, distance "C" from the second lens surface 62. These two features combine to increase the effective length of the outer surface of the wall of the retention tube 54 relative to the inner tube surface. This results in greater compliance of the retention tube 54 at the interface 90, which in turn reduces localized stress on the second surface 62 of the lens 52. As a result, stress cracks and other undesired effects on the lens are reduced. Further, forces that tend to urge the lens toward the first end 70 of the retention tube 54 are reduced as a result of these features. Reduction of such forces is desirable to ensure small micron-range movements of the lens 52 within the retention tube 54 are avoided during the thermal cycling to which the LMA is exposed during TOSA operation. In addition to the undercut and wall thinning there are alternative techniques of accomplishing force reduction. For instance, minimizing interference between the tube and the lens also reduces the force that tends to urge the lens toward the first end 70 of the retention tube 54, although reducing interference also reduces the retention force. More compliant materials also tend to reduce this force.

The reduced retention tube thickness and undercut described above serve as exemplary means for providing additional compliance of the retention tube. It is appreciated that in addition to these features, which are designed to reduce stress on the lens, other features can be included on the retention tube inner diameter to provide additional retention tube compliance. One example of this is the inclusion on one or more regions defined on the retention tube inner surface, proximate the final lens placement position or near the tube opening, that are of a greater diameter relative to other portions of the inner surface, to reduce compression forces by the retention tube on the lens during pressing into the tube or after final positioning. Thus, the present invention should not be construed as being limited to what is explicitly disclosed herein with respect to increasing compliance of the retention tube.

The LMA 50 is assembled by first joining the retention tube 54 to the base 56, if necessary, assuming the two components are not integrally formed, as shown in FIG. 2. Then, using a mechanical press or other suitable device, the lens 52 is inserted into the first end 70 of the retention tube 54 and into the volume defined by the inner diameter 74. The annular chamfer 76 is included on the first end 70 to assist lens insertion.

As shown in FIG. 2, the lens 52 is inserted into the volume defined by the retention tube inner diameter 74 such that the first lens surface 60 is positioned within the interior of the retention tube 54 a distance "D" past the retention tube first end 70. This inset of the lens 52 assists in retaining the lens in a preferred position after lens insertion is complete. In particular, the ring of the retention tube wall proximate the first end 70—corresponding to the inset distance "D"—is compliant, as explained above, thereby causing it be compressed radially outward as the lens is inserted into the retention tube 54. Once the lens 52 has passed the wall region corresponding to inset distance "D", however, the compression force against the retention tube wall is no longer present, and the compliant retention tube wall contracts radially inward a small distance. This radial contraction forms a slight bump adjacent the first lens surface 60 that assists in retaining the lens 52 in place. In another embodiment, the lens 52 can be only partially inserted in the volume defined by the retention tube inner diameter 74 such that the lens first surface 60 is exposed in an overhang arrangement. Though such lens placement may introduce some shear stresses for the lens, it may nonetheless be desirable in order to position the lens closer to other TOSA components.

As a result of lens placement within the retention tube as described above, higher manufacturing tolerances can be borne for the components of the LMA, including the lens itself and the retention tube. Placement of the lens in the retention tube is accomplished using a simple, straightforward process. Further, the absence of lens retaining features, such as shoulders, on the retention tube inner diameter surface allows for easier finishing or machining processing of this surface. These features equate to reduced assembly costs for the LMA, in addition to higher manufacturing yields.

In yet other embodiments, the LMA can be modified to include multiple lens that are press fit within one or more retention tubes, if desired.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A lens mount assembly comprising:
   a retention portion;
   a lens that includes a pair of surfaces that intersect each other at an angle so as to define an intersection, the lens being retained within the retention portion by way of an interference fit between the lens and the retention portion, the interference fit contributing to deformation of the retention portion such that the retention portion covers a portion of a lens surface of the lens, and the retention portion remaining deformed in a location proximate the intersection of the lens surfaces after final positioning of the lens within the retention portion; and
   a base portion attached to the retention portion and configured to facilitate attachment of the lens mount assembly to an optical device.

2. A lens mount assembly as defined in claim 1, wherein the retention portion is composed of a 303 stainless steel.

3. The lens mount assembly as recited in claim 1, wherein the retention portion comprises a retention tube.

4. The lens mount assembly as recited in claim 1, wherein an undercut is defined proximate an interface between the retention portion and the base portion.

5. The lens mount assembly as recited in claim 1, wherein the lens is retained by the retention portion without the use of adhesive.

6. The lens mount assembly as recited in claim 1, wherein a plurality of corrugations are defined about a perimeter of the base portion.

7. The lens mount assembly as recited in claim 1, wherein the lens has a generally cylindrical shape.

8. The lens mount assembly as recited in claim 1, wherein the retention portion comprises a compliant material that resiliently deforms in response to imposition of a press-fit force associated with the lens.

9. A TOSA including the lens mount assembly of claim 1, the TOSA further including an optical emitter arranged for optical communication with the lens.

10. An optical transceiver module including the TOSA of claim 9, the optical transceiver module further including a printed circuit board configured for electrical communication with the optical emitter.

11. An optical transceiver module, comprising:
    a housing containing a printed circuit board and at least one optical subassembly, wherein the at least one optical subassembly includes a lens mount assembly, the lens mount assembly comprising:
    a lens having a cylindrical outer periphery, the outer periphery bounded by first and second surfaces through which an optical signal can pass;
    a compliant retention tube having a first end that is in communication with a volume defined by an inner surface of the retention tube, wherein the lens is received via the first end into the volume such that the outer periphery engages the retention tube inner surface in a press fit; and
    a mounting surface that engages a portion of the at least one optical subassembly to secure the lens mount assembly with respect to the at least one optical subassembly;
    wherein the retention tube provides compressive force on the lens such that a lip is formed by the retention tube proximate the first surface of the lens as a result of the lens being received within the volume defined by the retention tube inner surface, the first lens surface being relatively closer to the first end of the retention tube than the second lens surface.

12. An optical transceiver module as defined in claim 11, wherein the lens is secured within the retention tube without the use of an adhesive.

13. An optical transceiver module as defined in claim 11, wherein the inner surface of the retention tube and the outer periphery of the lens are sized to provide an interference fit with respect to one another.

14. An optical transceiver module as defined in claim 11, wherein the retention tube includes a cylindrical wall, and wherein the cylindrical wall includes a region of decreased wall thickness proximate the second lens surface to provide additional compliance of the retention tube.

15. An optical transceiver module as defined in claim 14, wherein the mounting surface is formed on a base that is integrally formed with the retention tube.

16. An optical transceiver module as defined in claim 15, wherein the interface between the base and the retention tube includes an undercut portion, the undercut portion being located proximate the region of decreased wall thickness.

17. An optical transceiver module as defined in claim 11, wherein the lens is inserted into the retention tube using a press device.

18. An optical transceiver module as defined in claim 11, wherein the first end of the retention tube includes a chamfer to assist the insertion of the lens into the retention tube volume.

19. An optical transceiver module, comprising:
    a housing;
    a printed circuit board at least partially disposed within the housing; and
    an optical subassembly at least partially disposed within the housing and configured for electrical communication with the printed circuit board, and the optical subassembly including a lens mount assembly that comprises:
    a lens;
    a retention tube within which the lens is at least partially retained by way of an interference fit between the retention tube and the lens, the interference fit contributing to deformation of the retention tube such that a lip is formed in the retention tube proximate a surface of the lens, the lip being formed as a result of the deformation of the retention tube, and the lip being maintained in the retention tube after final positioning of the lens within the retention portion; and a base to which the retention tube is attached, the base being engaged with a portion of the optical subassembly.

20. The optical transceiver module of claim 19, wherein a portion of the retention tube is resiliently deformed.

21. The optical transceiver module of claim 19, wherein the lens is retained in the retention tube without the use of adhesive.

22. The optical transceiver module of claim 19, wherein the optical subassembly comprises a TOSA that includes an optical transmitter arranged for optical communication with the lens.

* * * * *